United States Patent
Sones

(10) Patent No.: US 12,418,563 B2
(45) Date of Patent: Sep. 16, 2025

(54) AUTOMATED REMEDIATION OF DENIAL-OF-SERVICE ATTACKS IN CLOUD-BASED 5G NETWORKS

(71) Applicant: DISH Wireless L.L.C., Englewood, CO (US)

(72) Inventor: Nathan Sones, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 131 days.

(21) Appl. No.: 18/525,070

(22) Filed: Nov. 30, 2023

(65) Prior Publication Data

US 2024/0372891 A1  Nov. 7, 2024

Related U.S. Application Data

(60) Provisional application No. 63/500,230, filed on May 4, 2023.

(51) Int. Cl.
*H04L 9/40* (2022.01)
*G06F 11/14* (2006.01)
*H04L 41/40* (2022.01)

(52) U.S. Cl.
CPC ...... *H04L 63/1458* (2013.01); *G06F 11/1438* (2013.01); *H04L 41/40* (2022.05)

(58) Field of Classification Search
CPC .......... H04L 63/1458; G06F 11/1438
See application file for complete search history.

(56) References Cited

U.S. PATENT DOCUMENTS

| 10,270,794 | B1* | 4/2019 | Mukerji | H04L 63/1458 |
| 2013/0219502 | A1* | 8/2013 | Danford | G06F 21/55 726/23 |
| 2015/0026800 | A1* | 1/2015 | Jain | H04L 63/1416 726/22 |
| 2016/0164910 | A1* | 6/2016 | Tang | H04L 43/16 726/14 |
| 2018/0262467 | A1* | 9/2018 | Jayawardena | H04L 63/0254 |
| 2021/0084068 | A1* | 3/2021 | Teng | H04L 45/122 |

* cited by examiner

*Primary Examiner* — Hee Soo Kim
(74) *Attorney, Agent, or Firm* — KW Law, LLP

(57) ABSTRACT

Systems, methods, and devices automatically remediate denial-of-service (DOS) attacks on a 5G data and telephone network. An example process counts a number of dynamic ports assigned to a service running on a virtualized resource of the 5G data and telephone network. The process determines whether the number of dynamic ports assigned to the service of the 5G data and telephone network is greater than a first threshold. A processor load of the service running on the virtualized resource of the 5G data and telephone network is retrieved. The processor load of the service may be less than a second threshold, indicating a DOS attack in the 5G data and telephone network. The DOS attack is remediated by taking an action on the host operating system of the virtualized resource of the 5G data and telephone network.

20 Claims, 3 Drawing Sheets

AUTOMATED REMEDIATION OF DENIAL-OF-SERVICE ATTACKS IN CLOUD-BASED 5G NETWORKS

CROSS-REFERENCE TO RELATED APPLICATIONS

This application claims priority to U.S. Provisional Patent Application No. 63/500,230, filed on May 4, 2023, and entitled "AUTOMATED REMEDIATION OF DENIAL-OF-SERVICE ATTACKS IN CLOUD-BASED 5G NETWORKS," which is incorporated by reference herein.

TECHNICAL FIELD

The following discussion generally relates to 5G telephone networks, and in particular to remediating denial-of-service attacks on virtualized 5G infrastructure.

BACKGROUND

The proliferation of cloud-based 5G networks has greatly expanded the capabilities of modern telecommunications systems. These networks allow for faster data transfer speeds, increased capacity, and improved reliability. However, with these benefits come new challenges, including the increased risk of accidental denial-of-service (DOS) attacks.

A DOS attack occurs when a network or system is overwhelmed with traffic, causing it to crash or become unavailable. DOS attacks can be caused by various factors such as malware, botnets, or even legitimate traffic from high-bandwidth applications. Sometimes a virtualized machine can suffer an accidental DOS attack when too many network ports on the virtual machine or underlying hardware are assigned. In the context of a 5G network, a DOS attack can lead to service outages, loss of revenue, and reputational damage for service providers. Existing solutions to address DOS attacks in 5G networks are limited and often rely on reactive measures such as blocking traffic or diverting it to other servers. However, such solutions can be ineffective in remediating accidental DOS attacks caused by legitimate traffic.

SUMMARY

Systems, methods, and devices of the present disclosure may automatically remediate denial-of-service (DOS) attacks on a 5G data and telephone network. An example process includes the step of counting a number of dynamic ports assigned to a service running on a virtualized resource of the 5G data and telephone network. The process determines whether the number of dynamic ports assigned to the service of the 5G data and telephone network is greater than a first threshold. A processor load of the service running on the virtualized resource of the 5G data and telephone network is retrieved. The processor load of the service may be less than a second threshold, which detects a DOS attack in the 5G data and telephone network. The processor load is typically determined by a host operating system of the virtualized resource. The DOS attack is remediated by taking an action on the host operating system of the virtualized resource of the 5G data and telephone network.

In various embodiments, the virtualized resource includes a virtualized distributed unit, a virtualized central unit, or a virtualized network function of the 5G data and telephone network. The service includes a secure shell (SSH) service. Taking action on the host operating system can include closing the dynamic ports assigned to the service, stopping and restarting the service, or rebooting the host operating system of the virtualized resource of the 5G data and telephone network. The first threshold is about 100 ports. The second threshold is about 10% of processor capacity.

Another example of an automated process for remediation DOS attacks in a 5G data and telephone network includes the steps of counting a number of dynamic ports assigned to a monitored resource in the 5G data and telephone network, determining the number of dynamic ports assigned to the monitored resource is greater than a first threshold, and retrieving a processor load of the monitored resource in the 5G data and telephone network. The process also determines the processor load of the monitored resource is less than a second threshold to identify a DOS attack in the 5G data and telephone network, and the processor remediates the DOS attack.

In various embodiments, the monitored resource includes a virtualized distributed unit, a virtualized central unit, or a virtualized network function of the 5G data and telephone network. The monitored resource includes a service running on a virtualized distributed unit or a virtualized central unit of the 5G data and telephone network. Remediating the DOS attack can include closing the dynamic ports assigned to the monitored resource, stopping and restarting the monitored resource, or rebooting an operating system running the monitored resource. The first threshold can be about 100 ports, and the second threshold can be about 10% of processor capacity.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

Figure 1:
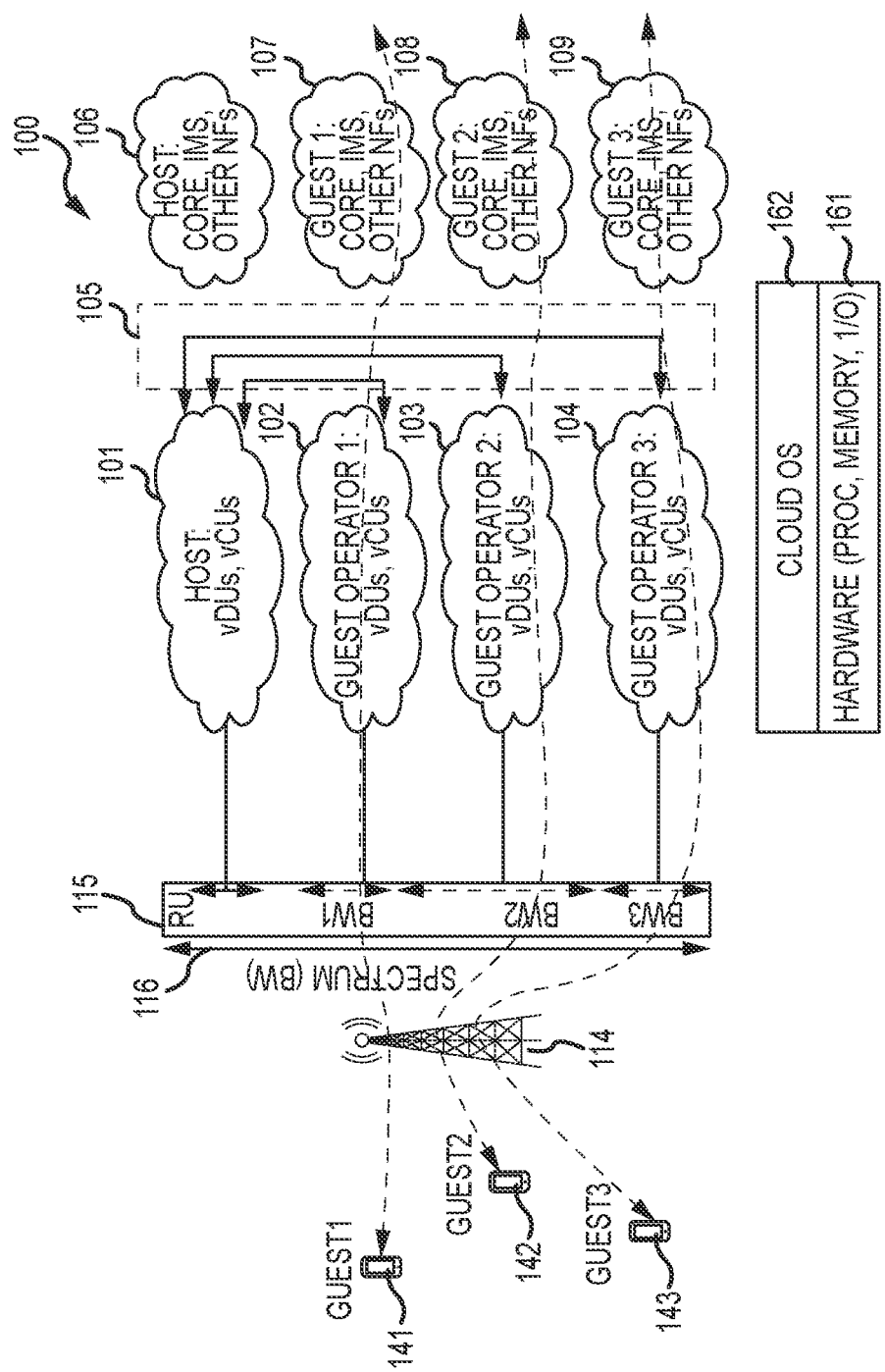
FIG. 1 illustrates an example of a 5G data and telephone network implemented using virtualized network functions, in accordance with various embodiments.

The following detailed description is intended to provide several examples that will illustrate the broader concepts set forth herein, but it is not intended to limit the invention or the application and uses of the invention. Furthermore, there is no intention to be bound by any theory presented in the preceding background or the following detailed description.

The present invention remediates DOS attacks in cloud-based 5G data and telephone networks. Connections on virtualized infrastructure are monitored at a port level. A process terminates connections on assigned dynamic ports on a virtual machine or underlying hardware in response to a threshold number of ports being in use. Closing assigned ports allows systems and methods of the present disclosure to clear unwanted connections that are unnecessarily consuming computing resources. The invention can be implemented using existing cloud-based infrastructure and can be integrated into existing 5G network architectures.

Systems, methods, and devices of the present disclosure support IP-based network communications for components of a 5G network built on cloud infrastructure. The system can access flow logs that capture information about port usage on network interfaces in a virtual private cloud (VPC). Port management tools of the present disclosure may be implemented by cloud services to host VPCs such as AWS, ServerSpace, Microsoft Azure, Google Cloud Platform, IBM Cloud Services, Kamatera, VMware, or any other cloud system. The operator of a cloud-based 5G data and telephone network may not have an inventory of all cloud-provider computing assets supporting their VPC on typical cloud computing platforms. Systems, methods, and devices of the present disclosure generate and aggregate custom log data from hundreds of user accounts to monitor computing port usage of the cloud-based 5G data and telephone network at a single point. Some embodiments run a local process or application with elevated privileges sufficient to close ports, restart services, restart applications or instances, scale virtualized network functions, or otherwise remediate DOS attacks against monitored resources in a 5G data and telephone network.

Computing devices and virtual machines running in a 5G network can have a limited number of logical communication ports. These computing resources see a high volume of connections come and go, but connections can occasionally remain open in a stale state. A typical computing device has 65,536 network ports. Ports 0 to 1023 are typically assigned to known uses and can be referred to as system ports or well-known ports. Ports 1024 to 65, 535 can be dynamically assigned or private ports, with ports 1024 to 49, 151 sometimes referred to as registered ports and used for purposes registered with the Internet Assigned Numbers Authority (IANA). Network functions that support a 5G telephone network frequently communicate on dynamic ports. Various embodiments monitor port usage on virtualized network functions and supporting computing devices to reset connections in response to usage exceeding a threshold value.

As used herein, the term network function may describe a functional building block within a network infrastructure. Network functions typically include well-defined external interfaces and well-defined functional behavior. Network functions may be implemented in a cloud-based environment using virtualization tools such as, for example, virtual machines or containers. The systems described herein may thus spool up or retire network functions by launching a new instance or killing an existing instance of the network function. Examples of 5G core network functions suitable for virtualization and logging as described herein may include Application Function (AF), Access and Mobility Management Function (AMMF), Authentication Server Function (AUSF), Network Function Local Repository (NRF), Packet Forwarding Control Protocol (PFCP), Session Management Function (SMF), Unified Data Management (UDM), Unified Data Repository (UDR), or User Plane Function (UPF).

With reference now to FIG. 1, an example of a 5G data and telephone network 100 built on a cloud-based environment is shown, in accordance with various embodiments. 5G data and telephone network 100 is implemented on cloud-based infrastructure to facilitate dynamic network adaptations. 5G data and telephone network 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own RUs for use by one or more guest network operators, though the systems, methods, and devices described herein could be applied to any wireless network using virtualized network functions. Examples of guest network operators may include internal brands of the host operator, system integrators, enterprises, external MVNOs, or converged operators. The host and the guest network operators may maintain desired network functions to support user equipment (UE) 141, 142, 143. Network functions can use dynamically assigned ports for network communications supporting operations of 5G data and telephone network 100.

In the example of FIG. 1, each RU 115 communicates with UE 141, 142, 143 operating within a geographic area using one or more antennas 114 (also referred to herein as towers) capable of transmitting and receiving messages within an assigned spectrum 116 of electromagnetic bandwidth. In various embodiments, guest networks 102, 103, 104 interact with a provisioning plane 105 to obtain desired spectrum across one or more of the RUs 115 operated by the host network 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host network 101. Network services and corresponding user accounts may be scaled up and down in response to network load, with logging for network functions occurring in real-time or near real-time.

The Open Radio Access Network (O-RAN) standard breaks communications into three main domains: the radio unit (RU) that handles radio frequency (RF) and lower physical layer functions of the radio protocol stack, including beamforming; the distributed unit (DU) that handles higher physical access layer, media access (MAC) layer, and radio link control (RLC) functions; and the centralized unit (CU) that performs higher level functions, including quality of service (QOS) routing and the like. The CU also supports packet data convergence protocol (PDCP), service data adaptation protocol (SDAP), and radio resource controller (RRC) functions. The RU, DU, and CU functions are described in more detail in the O-RAN standards, as updated from time to time, and may be modified as desired to implement the various functions and features described herein. In the example of FIG. 1, host network 101 maintains one or more DUs and CUs (i.e., network functions) as part of its own network. The DU communicates with one or more RUs 115, as specified in the O-RAN standard. The virtualized DUs and CUs assess port usage at predetermined intervals or in response to triggering events.

The various network components shown in FIG. 1 are typically implemented using software or firmware instructions that are stored in a non-transitory data storage (e.g., a disk drive, solid-state memory, or other storage medium) for execution by one or more processors. The various components shown in FIG. 1 can be implemented using cloud computing hardware 161 and an appropriate operating system 162, such as the Amazon® Web Service (AWS) platform offered by Amazon Inc., although other embodiments could use other cloud platforms or any type of conventional physical computing hardware, as desired.

As illustrated in the example of FIG. 1, 5G network 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources.

Guest networks 102, 103, 104 operated by guest operators can manage their own networks using allocated portions of spectrum 116 handled by one or more of the RUs 115 associated with host network 101. The guest networks 102, 103, 104 communicate with one or more UEs 141-143 using allocated bandwidth on the host's RU 115. Guest networks 102, 103, 104 may include one or more virtual DUs and CUs, as well as other network services 107, 108, 109. Generally, one or more guest operators will instantiate its own 5G virtualized network functions (e.g., CMS, vCUs, vDUs, etc.) using cloud-based resources. Port usage in each virtualized network function can be monitored by the host operator or by applications or scripts running in the network functions themselves, for example.

Figure 2:
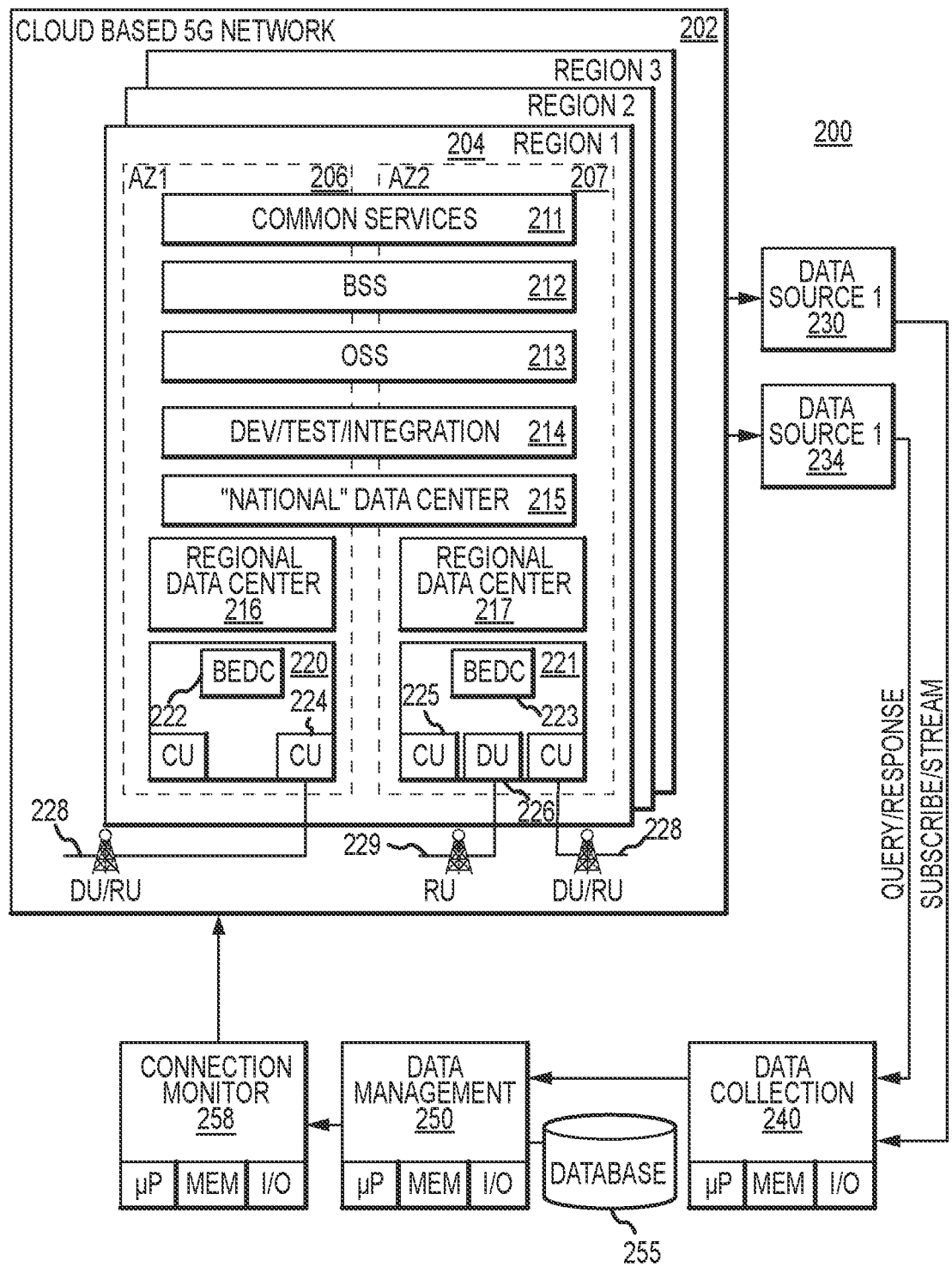
FIG. 2 illustrates an example of cloud infrastructure supporting a 5G data and telephone network, in accordance with various embodiments.

With reference to FIG. 2, an example of cloud-based computing resources 200 supporting 5G network 202 is shown, in accordance with various embodiments. In the example of FIG. 2, 5G network 202 encompasses data processing services supporting multiple regions 204, each having one or more availability zones (AZs) 206, 207, each acting as a separate data center with its own redundant power, network connectivity, and other resources. In some embodiments, the various AZs operating within the same region will provide redundancy in the event a neighboring AZ fails or is overloaded. New instances of network functions may be dynamically added to the network to support services of 5G data and telephone network 100 (of FIG. 1). New instances begin using dynamically assigned network ports in response to network communications after coming online. System-wide data collection on port usage and processor load enables centralized monitoring, though various embodiments run local processes, applications, or jobs that assess port usage and processor load to trigger automatic remediation.

The example of FIG. 2 illustrates three regions, with region 204 having two AZs 206, 207, although other embodiments could include any number of regions and AZs providing any number of services and resources. The regions and AZs are often described herein with reference to geographic locations, but in practice, the regions and AZs could be equivalently organized based upon customer density, user density, expected network demand, availability of electric power or bandwidth, or any other factors. As noted above, it will still be necessary to deploy RUs within broadcast range of end users. By implementing the other functions of the network using virtualized hardware operating within a cloud-type architecture, geographic restrictions on 5G network 202 can be reduced. This can provide substantial efficiencies in deployment and expansion of 5G network 202, while also allowing for more efficient use of computing resources, data storage, and electric power.

In example of FIG. 2, a network operator maintains ownership of one or more RUs 228, 229 associated with a wireless network cell. Each RU 228, 229 communicates with UE operating within a geographic area using one or more antennas. In the example illustrated in FIG. 2, common services (e.g., billing, guest network allocation, etc.) can be performed in a shared or common service 211 across the available AZs 206, 207. Typically, these shared services will be implemented within a common virtual private cloud (VPC) operating within the cloud environment. Similarly, shared VPC systems can support business support system (BSS) 212, operational support services (OSS) 213, development/test/integration features 214, or the like across the entire region. A region wide data center (identified as "national" data center 215 in FIG. 2) could be implemented in a shared VPC across AZs 206, 207, if desired, with subordinate data centers (e.g., "regional" data centers 216, 217) being separated into different VPCs for each of the AZs 206, 207. Additional levels of data centers could be provided, if desired, or the different data center functions could be differently organized in any number of equivalent embodiments.

In various embodiments, each AZ 206, 207 includes one or more breakout edge data centers (BEDCs) each supporting a local zone (LZ) with one or more RUs. The BEDCs are ideally organized for low latency with high throughput and low latency to the various UE operating within the LZ. BEDCs 222, 223 may host VPC 220, 221 or other virtualization environments that typically implement one or more CUs 224, 225 in accordance with the O-RAN specifications. BEDCs may also implement user plane functions that handle user data sessions for gaming, streaming, and other network services. Again, any number of BEDCs and other data centers may be implemented using any number of different or shared VPCs in the cloud environment.

As noted above, each of the various network components shown in FIG. 2 is typically implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, or the like.

In various embodiments that make use of a data pipeline, one or more data sources 230, 234 can be provided to obtain raw data from one or more of the components of network 202. Data sources 230, 234 may receive data as part of a data stream, if desired. Other data sources 230, 234 may receive and maintain log data or the like from one or more associated components. Any number of streaming or query-based data sources 230, 234 may be deployed within cloud-based computing resources 200.

In the example shown in FIG. 2, data source 230 may be configured in accordance with real time data and message queue tools such as, for example, the KINESIS Data Firehose supported by AWS. Data source 230 can supply a delivery stream of data to a selected destination in real time. The cloud-based tools described herein may be installed to execute on any sort of hardware, including a conventional computer server with a processor, memory, and input/output interfaces to the appropriate components of network 202. Equivalently, data source 230 may be implemented using a virtual private cloud or virtual server system as part of a cloud provider, as desired.

The streaming data source 230 will typically be configured to receive real-time data (or near real time data, accounting for some delays inherent in data processing, communications, and the like) from one or more network functions of network 202. Streaming data may be particularly useful for network components that generate substantial amounts of real-time data (e.g., port usage, performance measurements, communication failures, etc.). Data source 230 will be configured to receive the data stream from the monitored network functions or instances, typically as a consumer process executed by data source 230. Other embodiments may use different cloud-based architecture or may be configured in any other manner.

If desired, multiple components of 5G network 202 could supply streaming data to a common data source 230. Virtualized DU 226 and CU 224, 225 modules of 5G network 202 may write substantial amounts of real-time data that can be efficiently pipelined through a combined streaming data source 230 in some embodiments. Core network functions can also have logs streamed into data source 230. Logs can include real-time port usage data for virtualized computing units and underlying hardware and operating systems.

In the example of FIG. 2, data source 234 is shown as a query-based source that collects data from one or more components of 5G network 202. Data handled by query-based sources tends to be less reliant upon real-time delivery for status updates. Log data, fault metrics, performance metrics, and other types of time-series data may be particularly well-suited for query-type collection.

In one embodiment, query-based data source 234 is implemented for a pull-based data collection model using HTTP-type messaging. Software is configured to run on a computer server (implemented with conventional hardware or cloud-based resources) that queries the monitored components according to any desired time schedule to receive data. The data received in response to the queries may be locally cached in any sort of non-transitory memory (e.g., solid-state memory, magnetic or optical memory, cloud-based sources, or the like) for subsequent retrieval and processing as desired. Query-based data sources may be particularly useful in tracking data produced by the various DUs, MTAs, and other components of the network that produce substantial amounts of log data. Typically, each component is configured to write its output/log data to the data source 234, as desired.

In various embodiments, data collection system 240 can communicate with one or more data sources 230, 234 to obtain streaming or query-based data. In various embodiments, data collection system 240 subscribes to one or more data feeds or other streaming services associated with data source 230. Data collection system 240 may also be configured to perform queries against query-based data source 234. Data source 234 typically receives the requested or subscribed data, formats or filters the received data as appropriate, and forwards the collected data to a data management system 250 for storage, reporting, or any other further processing. In an AWS-based example, an S3 data bucket could be the destination for a KINESIS Data Firehose stream. The S3 data bucket may comprise a notification queue, and the delivery stream may subscribe to the queue to deliver streaming data to the data bucket.

In various embodiments, the data collection system 240 receives data in JSON or similar format, appends source or service location information as tags, and pushes the tagged data to the data management system 250 (using, e.g., HTTP structures or the like). Generally, the data collection system will be configurable to specify batch sizes, delivery times, or other parameters for obtaining query-based data or for pushing collected data to data management system 250. Some embodiments may also filter the received data as desired to remove unwanted or unnecessary data that would otherwise consume excess storage in data management system 250. Other embodiments may perform additional monitoring, as needed.

Data management system 250 can be any data processing system capable of receiving the data from data source 234 and presenting the collected data for further use. In various embodiments, data management system 250 is a computer server implemented with conventional or virtual cloud-based hardware executing software for managing collected data. In various embodiments, data management system 250 stores received data in a database 255 (e.g., an S3 data bucket) for later retrieval, as desired. Data management system 250 may also provide reports to human or automated reviewers. Data management system 250 could include, for example, ATHENA analytics capable of receiving and executing a query against database 255 using a user login, hostname, IP address, or other identifying information for a monitored resource.

Connection monitor 258 can display data and analysis visually in dashboard form or in a machine-readable form such as a tagged data store, a JSON file, or other structured or unstructured data formats. Connection monitor 258 may include input channels in some embodiments to dynamically configure a query to retrieve port information or processor load for monitored resources. Connection monitor 258 can be used to assess network performance and port characteristics of virtualized network functions in a 5G data and telephone network. For example, output can include port usage counts and processor load for a virtualized DU or virtualized CU.

The example illustrated in FIG. 2 shows data sources 230, 234 as obtaining aggregated data from components of 5G network 202. This points out the relationships between the sources of data, data collection system 240, and data management system 250. In a practical implementation, however, data collection system 240 may be equivalently configured to subscribe to live data streams or to directly poll components of 5G network 202, without the need for separate data aggregation systems.

In some equivalent embodiments, the functionality of data sources 230, 234 is designed into the components of the 5G network 202 themselves, thereby obviating the need for separate aggregation. One or more components of 5G network 202 may be configured to supply a data stream directly to data collection system 240, for example. Similarly, data collection system 240 could posit queries directly to components of 5G network 202, if desired, without the need for intervening processing modules. Processed data is provided for delivery to the data management system 250 described above. In various embodiments, connection monitor 258 provides data to data management system 250 using HTTP structures (e.g., HTTP "PUT" features, JSON, unstructured data, or the like). Other embodiments could implement the various functions and components described herein in any number of equivalent arrangements.

In operation, then, a data management system 250 obtains streaming or query-based data from one or more components of a 5G wireless network operating within a cloud-based computing environment. The data is obtained directly from the component, or via intervening data source systems 230, 234, that aggregate data from multiple data sources within network 202. Collected data is tagged and filtered as desired, and the resulting data is delivered to a data management system 250 for storage, reporting, or other actions as appropriate. Other embodiments may include other processing modules in addition to those illustrated, or may provide the various features and functions described herein using equivalent arrangements of processing modules and features.

Figure 3:
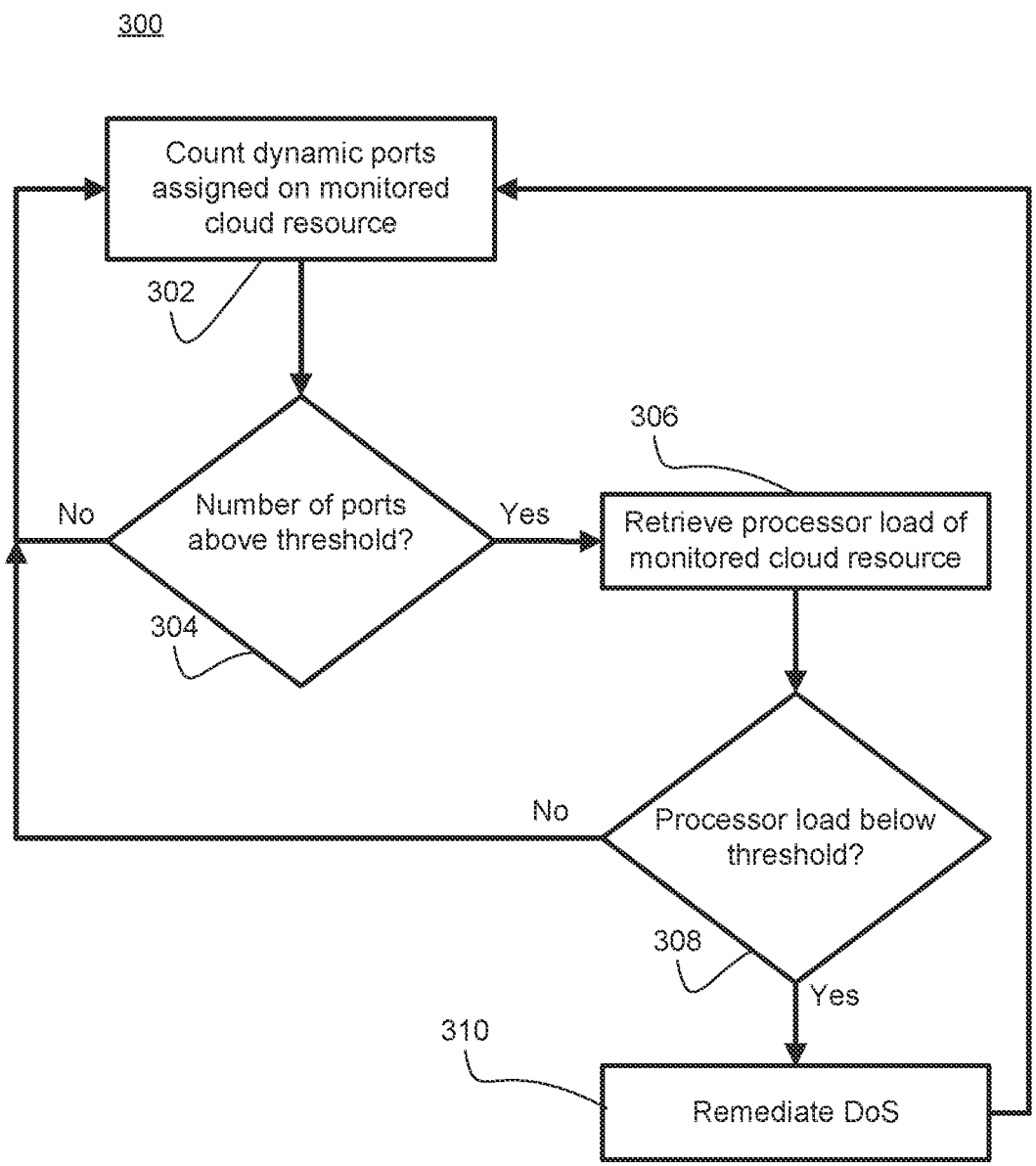
FIG. 3 illustrates an example process for remediating denial-of-service attacks, in accordance with various embodiments.

Referring now to FIG. 3, an example process 300 for remediating denial-of-service (DOS) attacks on 5G network 202 is shown, in accordance with various embodiments. Process 300 may include counting the number of dynamic ports assigned on a monitored cloud resource (Block 302). A monitored cloud resource may include an instance of a network function, a virtualized DU, a virtualized CU, a service or application running on a host operating system or a virtualized operating system, or any other suitable target that communicates using dynamically assigned logical ports. For example, process 300 may count the number of dynamic ports currently in use by a secure shell (SSH) service supporting a network function. The count may be executed against a predetermined range of ports such as, for example, dynamic ports (49,151 to 65,535). In some embodiments, process 300 can count the number of dynamic ports currently assigned across an entire host operating system or a virtualized operating system. Process 300 and various steps thereof can be run by connection monitor 258 (of FIG. 2) against data management system 250 (of FIG. 2), by host operating systems running on discrete computing hardware, or by virtualized computing resources running on shared computing hardware.

In various embodiments, process 300 may assess whether the number of connections is greater than (or equal to) a threshold value (Block 304). The threshold value may be a hard-coded number in some embodiments. For example, the threshold number of ports assigned or allocated to a monitored resource could be about 100 ports, about 150 ports, about 200 ports, about 400 ports, about 1,000 ports, or any other desired number of ports. As used herein to describe port counts or processing load, the term about may mean+/−5%, +/−10%, +/−15%, +/−20%, or +/−25%. Continuing the SSH example above, the threshold number of ports could be set to 100 ports. Thresholds can also be percentage based. For example, a system wide threshold for port usage tends to be higher than an application-level threshold for port usage. Port usage may be determined by counting the number of ports associated with a user account of a cloud-based environment.

In various embodiments, process 300 may continue monitoring port usage of the monitored cloud resource in response to the port count being below the threshold (Block 302). Process 300 retrieves a processor load of the monitored resource in response to the number of ports exceeding the threshold value (Block 306). The processor load of the monitored resource may be measured in a percentage of processor bandwidth dedicated to the monitored resource. Continuing the SSH example, the processor may be operating at 50% of its total capacity with 5% of its total capacity used by threads or processes of the SSH service. Processor load can also be measured in processor time over a period or processor actions over a period. Command line tools such as htop in a linux virtual environment or perfmon in a windows virtual environment can be used to assess performance. Other OS-level commands or analysis tools can be used to retrieve processor load information in various embodiments. In some embodiments, data collected and stored in data management system 250 in real time or near-real time can be queried for processor load or port usage.

Various embodiments of process 300 assess whether the processor load is below a threshold value (Block 308). If the processor load is below the threshold (e.g., low processor load) and the port assignment count is high (e.g., high connection load), the process detects a DoS condition in the monitored cloud resource. If the processor load is greater than the threshold (e.g., high processor load) or the port assignment count is low (e.g., low connection load), the process detects a nominal operating condition in the monitored cloud resource. Continuing the SSH example, the SSH service may be stopped and restarted in response to the processor load of the SSH processes or threads being less than 15% and the connection count being greater than 100.

Process 300 remediates the DoS condition in response to detecting the processor load below the processor load threshold and the number of ports above the port assignment threshold (Block 310). The DoS condition may be remediated by taking an action on a host operating system of the monitored resource. The DoS condition may be remediated by stopping and relaunching or rebooting the monitored cloud resource of the 5G network. The DoS condition may be remediated by closing all connections on dynamic ports assigned to the monitored cloud resource of the 5G network. The DoS condition may be remediated by scaling the monitored service by spinning up additional instances or virtual machines to increase the capacity of the monitored service. Process 300 may continue monitoring port usage of the monitored cloud resource in response to the processor load being above the threshold (Block 302).

Various embodiments can implement escalating remediation techniques. For example, a first level of remediation may be closing all ports assigned to the monitored cloud resource in the dynamic port range. A second level of remediation may include stopping and restarting a service or application. A third level of remediation may include stopping and restarting a machine or virtualized machine hosting the monitored cloud resource. A fourth level of remediation may include launching additional instances of the monitored cloud resource.

Systems and methods described herein can automatically remediate DOS attacks that are based on port congestion. The DOS attacks are detected and remediated whether they are accidental or caused by a bad actor. Cloud-based data collection enables monitoring and remediation from outside the operating system of a monitored cloud resource in a 5G data and telephone network.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced, are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process for remediation denial-of-service (DOS) attacks in a 5G data and telephone network, comprising:
    counting a number of dynamic ports assigned to a service running on a virtualized resource of the 5G data and telephone network;
    determining the number of dynamic ports assigned to the service of the 5G data and telephone network is greater than a first threshold;
    retrieving a processor load of the service running on the virtualized resource of the 5G data and telephone network;
    determining the processor load of the service is less than a second threshold to identify a DOS attack in the 5G data and telephone network, wherein the processor load is determined by a host operating system of the virtualized resource; and
    remediating the DOS attack by taking an action on the host operating system of the virtualized resource of the 5G data and telephone network.

2. The automated process of claim 1, wherein the virtualized resource comprises a virtualized distributed unit, a virtualized central unit, or a virtualized network function of the 5G data and telephone network.

3. The automated process of claim 1, wherein the service comprises a secure shell (SSH) service.

4. The automated process of claim 1, wherein taking the action on the host operating system comprises closing the dynamic ports assigned to the service.

5. The automated process of claim 1, wherein taking the action on the host operating system comprises stopping and restarting the service.

6. The automated process of claim 1, wherein taking the action on the host operating system comprises rebooting the host operating system of the virtualized resource of the 5G data and telephone network.

7. The automated process of claim 1, wherein the first threshold is about 100 ports.

8. The automated process of claim 7, wherein the second threshold is about 10% of processor capacity.

9. An automated process for remediation denial-of-service attacks in a 5G data and telephone network, comprising:
    counting a number of dynamic ports assigned to a monitored resource in the 5G data and telephone network;
    determining the number of dynamic ports assigned to the monitored resource is greater than a first threshold;
    retrieving a processor load of the monitored resource in the 5G data and telephone network;
    determining the processor load of the monitored resource is less than a second threshold to identify a denial-of-service (DOS) attack in the 5G data and telephone network; and
    remediating the DOS attack.

10. The automated process of claim 9, wherein the monitored resource comprises a virtualized distributed unit, a virtualized central unit, or a virtualized network function of the 5G data and telephone network.

11. The automated process of claim 9, wherein the monitored resource comprises a service running on a virtualized distributed unit or a virtualized central unit of the 5G data and telephone network.

12. The automated process of claim 9, wherein remediating the DOS attack comprises closing the dynamic ports assigned to the monitored resource.

13. The automated process of claim 9, wherein remediating the DOS attack comprises stopping and restarting the monitored resource.

14. The automated process of claim 9, wherein remediating the DOS attack comprises rebooting an operating system running the monitored resource.

15. The automated process of claim 9, wherein the first threshold is about 100 ports.

16. The automated process of claim 15, wherein the second threshold is about 10% of processor capacity.

17. A non-transitory computer-readable medium configured to store instructions that, when executed by a processor in a 5G data and telephone network, cause the 5G data and telephone network to perform operations, the operations comprising:
    counting a number of dynamic ports assigned to a service running on a virtualized resource of the 5G data and telephone network;
    determining the number of dynamic ports assigned to the service of the 5G data and telephone network is greater than a first threshold;
    retrieving a processor load of the service running on the virtualized resource of the 5G data and telephone network;
    determining the processor load of the service is less than a second threshold to identify a denial-of-service (DOS) attack in the 5G data and telephone network, wherein the processor load is determined by a host operating system of the virtualized resource; and
    remediating the DOS attack by taking an action on the host operating system of the virtualized resource of the 5G data and telephone network.

18. The non-transitory computer-readable medium of claim 17, wherein the virtualized resource comprises a virtualized distributed unit, a virtualized central unit, or a virtualized network function of the 5G data and telephone network.

19. The non-transitory computer-readable medium of claim 17, wherein taking the action on the host operating system comprises stopping and restarting the service.

20. The non-transitory computer-readable medium of claim 17, wherein taking the action on the host operating system comprises rebooting the host operating system of the virtualized resource of the 5G data and telephone network.

* * * * *